United States Patent [19]

Korenberg

[11] 4,382,415
[45] May 10, 1983

[54] FLUIDIZED BED REACTOR UTILIZING A BOTTOMLESS PLATE GRID AND METHOD OF OPERATING THE REACTOR

[75] Inventor: Jakob Korenberg, York, Pa.

[73] Assignee: York-Shipley, Inc., York, Pa.

[21] Appl. No.: 213,349

[22] Filed: Dec. 5, 1980

[51] Int. Cl.³ .................... F23G 5/00; F23D 19/00
[52] U.S. Cl. ................................ 110/245; 432/58; 34/57 A; 34/57 B
[58] Field of Search ............... 34/57 A, 57B; 432/15, 432/58; 110/245

[56] References Cited

U.S. PATENT DOCUMENTS

| | | |
|---|---|---|
| 1,897,112 | 2/1933 | Courtney . |
| 2,361,796 | 10/1944 | Schrage . |
| 2,607,662 | 8/1952 | Huff .................... 34/57 A |
| 2,891,669 | 6/1959 | Lieffers et al. ............ 34/57 A |
| 3,052,990 | 9/1962 | Tailor .................. 34/57 A |
| 3,229,377 | 1/1966 | Hoyt ................... 34/57 A |
| 3,577,938 | 5/1971 | Muirhead et al. ........... 110/245 |
| 3,892,046 | 7/1975 | Cooke .................. 34/57 A |
| 3,907,674 | 9/1975 | Roberts et al. ............ 432/15 |
| 3,910,769 | 10/1975 | Mayer et al. ............. 34/57 A |
| 3,982,900 | 9/1976 | Malgarini et al. .......... 34/57 A |
| 4,073,064 | 2/1978 | Steever et al. ............ 34/57 A |
| 4,075,953 | 2/1978 | Sowards ................ 34/57 A |
| 4,227,488 | 10/1980 | Stewart et al. ............ 110/245 |
| 4,263,877 | 4/1981 | Urquhart ............... 110/245 |
| 4,279,205 | 7/1981 | Perkins et al. ............ 110/245 |

Primary Examiner—Henry C. Yuen
Attorney, Agent, or Firm—Finnegan, Henderson, Farabow, Garrett & Dunner

[57] ABSTRACT

A plate grid, and a fluidized bed reactor incorporating the plate grid, are disclosed. The plate grid includes air distribution apertures for delivering pressurized air to the reactor, and conduits for removing refuse, such as tramp material and/or agglomerated material, from the fluidized bed. The conduits include downwardly diverging walls extending from the lower face of the plate grid support surface. The fluidized bed reactor incorporating the plate grid further includes a chamber located below the plate grid support surface in communication at its upper end with both the air distribution apertures and conduits and at its lower end with a discharge port. The method of operating the fluidized bed reactor includes filling the reactor, and consequently the chamber and conduits, with granular material to form a space between the top surface of the granular material in the chamber and the lower face of the support surface. Pressurized gas is then introduced into this space and is discharged upwardly through the air distribution apertures. As refuse falls through the conduits, refuse and/or granular material is discharged through the discharge port at a rate to maintain the bed of granular material at a desired level.

5 Claims, 3 Drawing Figures

FLUIDIZED BED REACTOR UTILIZING A BOTTOMLESS PLATE GRID AND METHOD OF OPERATING THE REACTOR

BACKGROUND OF THE INVENTION

The present invention is directed to a fluidized bed reactor, and, particularly, to a fluidized bed reactor utilizing a plate support for the bed through which uncombusted material is removed from the reactor and a method for operating the fluidized bed reactor.

In fluidized bed reactors for combusting particulate material, the material to be combusted is generally fed over or into a bed of granular material, usually sand. In the past, two major types of surfaces have been used to support the bed of granular material, namely, bar grates and plate grates.

A bar grate is designed to permit air or other gases to pass up through the bed and to permit refuse in the form of uncombustible tramp material and/or agglomerated material to pass through the parallel spaces formed between adjacent bars and to be removed from the bottom of the reactor. In this type of grate, air is provided to a manifold that distributes the air to individual hollow bars connected to the manifold. The bars, in turn, have air nozzles that distribute the fluidizing air into the bed. An example of such a conventional bar grate is disclosed in U.S. Pat. No. 4,075,953 to Sowards, specifically in the embodiment depicted in FIG. 11 of the patent, and in U.S. Pat. No. 3,892,046 to Cooke.

A plate grate, unlike a bar grate, does not permit tramp material and/or agglomerated material to be removed from the bottom of the reactor. Instead, the plate, which is usually in the form of a flat surface, has air nozzles that distribute the fluidizing air into the bed. Air is supplied to the nozzles from an air box located below the plate. An example of such a conventional plate grate is also disclosed in U.S. Pat. No. 4,075,953, supra, specifically in the embodiment depicted in FIG. 1 of that patent, and in U.S. Pat. No. 3,907,674 to Roberts et al.

The above-discussed prior art grates have certain disadvantages that can limit the operating times of the fluidized bed. The bar grate, despite having parallel spaces between the bars through which granular material, tramp material, and/or agglomerted material can fall, tends to restrict the flow of material or to accumulate material as it passes between the parallel sides of adjacent bars due to bridging, jamming, or packing of the tramp material and/or agglomerated material. After a period of operation, the upper surface of the grate becomes covered by tramp material and/or agglomerated material. Moreover, granular bed material tends to enter the nozzles and accumulate in the bars, which bars are difficult to clean out. As a result, the fluidization of the bed, along with the effectiveness of the reactor, decreases. In addition, to the extent that each bar is, in effect, a separate air distribution chamber, the bar grate tends to be a relatively complex structure.

The plate grate, on the other hand, is a somewhat simpler structure. However, it suffers from the severe shortcoming of having no means by which tramp material and/or agglomerated material can be removed from the entire bed during operation. Such material can only be removed by shutting down the bed.

SUMMARY OF THE INVENTION

The present invention, in a radical departure from the conventional bar and plate grate systems discussed above, has solved the problem of tramp material and/or agglomerated material build-up that can cause the shutdown of a fluidized bed combustor, as well as the problem of granular bed material build-up in the bars of bar grates. In addition, the present invention provides for a much simplified air distribution system, with the concomitant advantage of reduced cost of production.

In accordance with the present invention, a plate grid for use in a fluidized bed reactor comprises a support surface, such as a solid plate, having an upper face and a lower face, air distribution means extending through the support surface for delivering pressurized air to the reactor, and conduit means extending through the support surface for removing refuse, such as tramp material and/or agglomerated material, from the reactor, the conduit means including downwardly diverging walls extending from the lower face of the support surface.

Preferably, the support surface has a refractory covering, and the air distribution means are apertures in the support surface with nozzles extending from the upper face of the support surface.

The present invention is also directed to a fluidized bed reactor that comprises peripheral walls forming a reactor bed, and the above-described plate grid. In addition, the fluidized bed reactor preferably includes chamber means having an upper end and a lower end located below the above-described support surface and in communication with both the air distribution means and conduit means, means to supply pressurized air to the upper end of the chamber means from a point at or above the lower end of the downwardly diverging walls, and means to remove particulate and tramp material from the chamber means.

Preferably, the upper end of the chamber means is formed by the lower face of the support surface and the lower end of the chamber means includes the means to remove particulate and tramp material. The pressurized air means preferably includes a plenum surrounding and in fluid communication with the upper end of the chamber means. Further, the length of the downwardly diverging walls is such that when the pressurized air means is operating at maximum air flow, the pressure drop across the conduits is greater than the pressure drop across the air distribution means, thereby preventing air from flowing through the conduits.

As previously mentioned, the plate grid of the present invention eliminates the problem of tramp material and/or agglomerated material build-up in the bed. This is a result of forming the conduit means with downwardly diverging walls. Since the walls downwardly diverge, the conduit means progressively increases in size. Thus, tramp material and/or agglomerated material passing through the horizontal support surface of the plate grid need pass only one point of contact before falling through. This arrangement minimizes the likelihood of a build-up of tramp material and/or agglomerated material on the upper face of the support surface since it prevents such material from jamming between the downwardly diverging walls.

The simplicity of construction of the present plate grid is attributable to it being, in effect, bottomless. More specifically, the chamber means, which is partly filled with granular material during operation and which receives the tramp material and/or agglomerated material from the reactor, also directly receives the pressurized air from the plenum. Thus, as will be more fully described in the description of the preferred embodiments hereinbelow, the need for having a separate closed air chamber in communication with the air distribution means is eliminated. This eliminates the problem of granular bed material entering the nozzles of the air distribution means and accumulating in a closed air chamber, such as the closed bars of a bar grate.

In addition, the invention includes a method of operating a fluidized bed reactor utilizing a bed of granular material for combusting non-uniform particulate matter, the combustion process resulting in refuse including tramp material and/or agglomerated material, the method comprising: providing a solid plate for supporting the granular bed and the particulate matter fed into the reactor for combustion, the plate having a plurality of apertures therethrough and conduits on the lower face of the plate communicating with openings through the plate, the openings being relatively large with respect to the apertures for permitting the refuse to pass therethrough, the walls of the conduits downwardly diverging as they extend from the lower face of the plate; enclosing the lower face of the plate in a chamber, the lower end of the chamber terminating in a closeable port; filling the reactor, and consequently the chamber and conduits, with granular material to form a space between the top surface of the granular material in the chamber and the lower face of the plate; introducing pressurized gas into the space for discharge upwardly through the apertures into the bed for fluidizing the bed during combustion; and discharging the refuse and/or granular material through the port at a rate to maintain the bed of granular material at a desired level as the refuse passes through the conduits into the chamber.

DESCRIPTION OF THE PREFERRED EMBODIMENTS

In order to more specifically define the present invention, reference will be made to the accompanying drawings, which are incorporated in and constitute a part of this specification, and which illustrate preferred embodiments of this invention.

Figure 1:
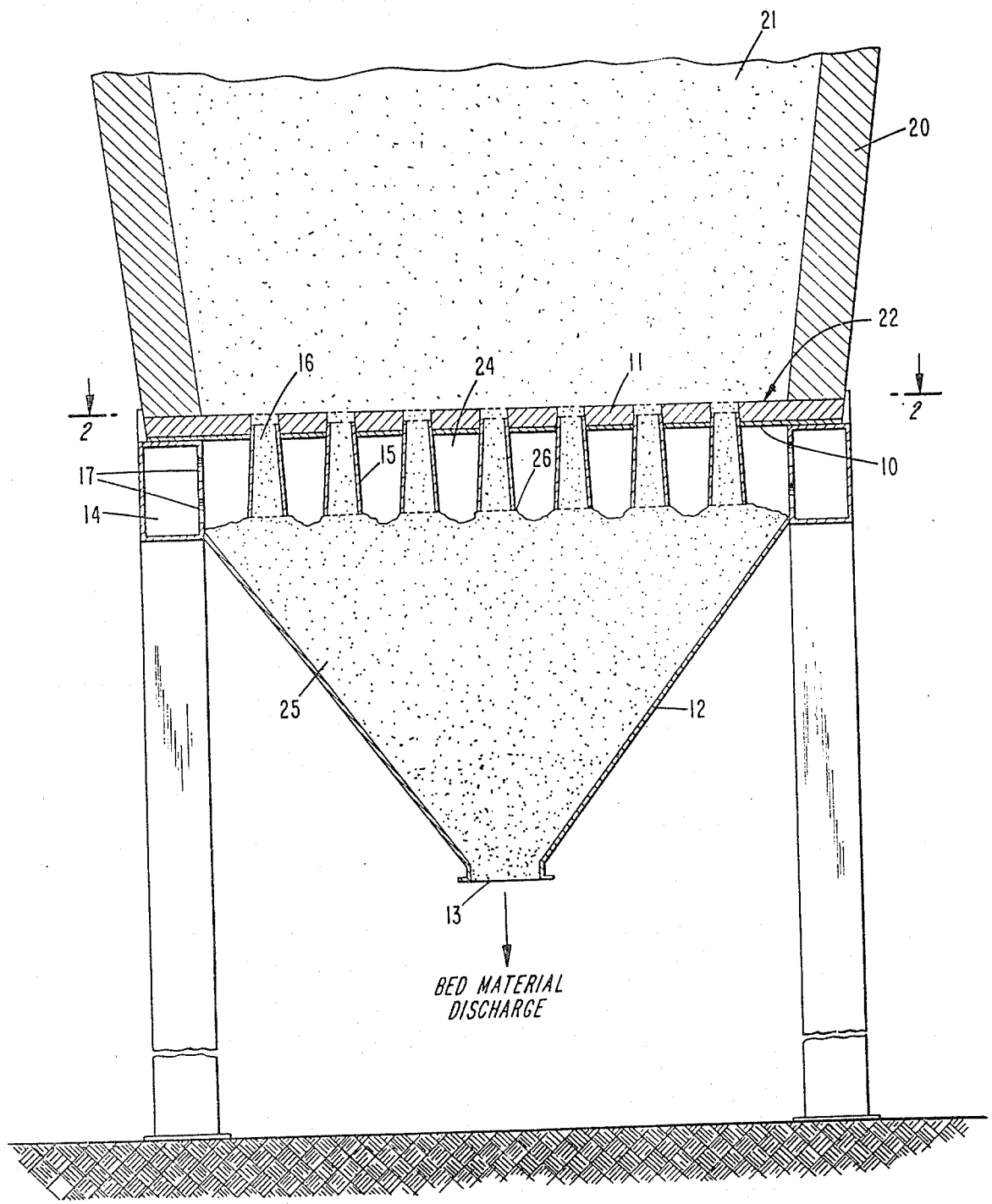
FIG. 1 is a vertical sectional view of a portion of a fluidized bed in accordance with the present invention.

As illustrated in FIG. 1, the fluidized bed reactor in accordance with the present invention has peripheral walls 20 that form a reactor bed in which a bed of granular material 21 is contained. The selection of the granular material will turn on the intended use of the reactor. Preferably, when the reactor is used as a combustor, the granular material is sand or other inert granular material. The granular bed is supported by a plate grid 22 that has a support surface 10. The support surface 10 can be made as a solid plate of any material that has sufficient strength to support the bed. The upper face of the support surface 10 is preferably provided with a refractory covering 11.

Figure 2:
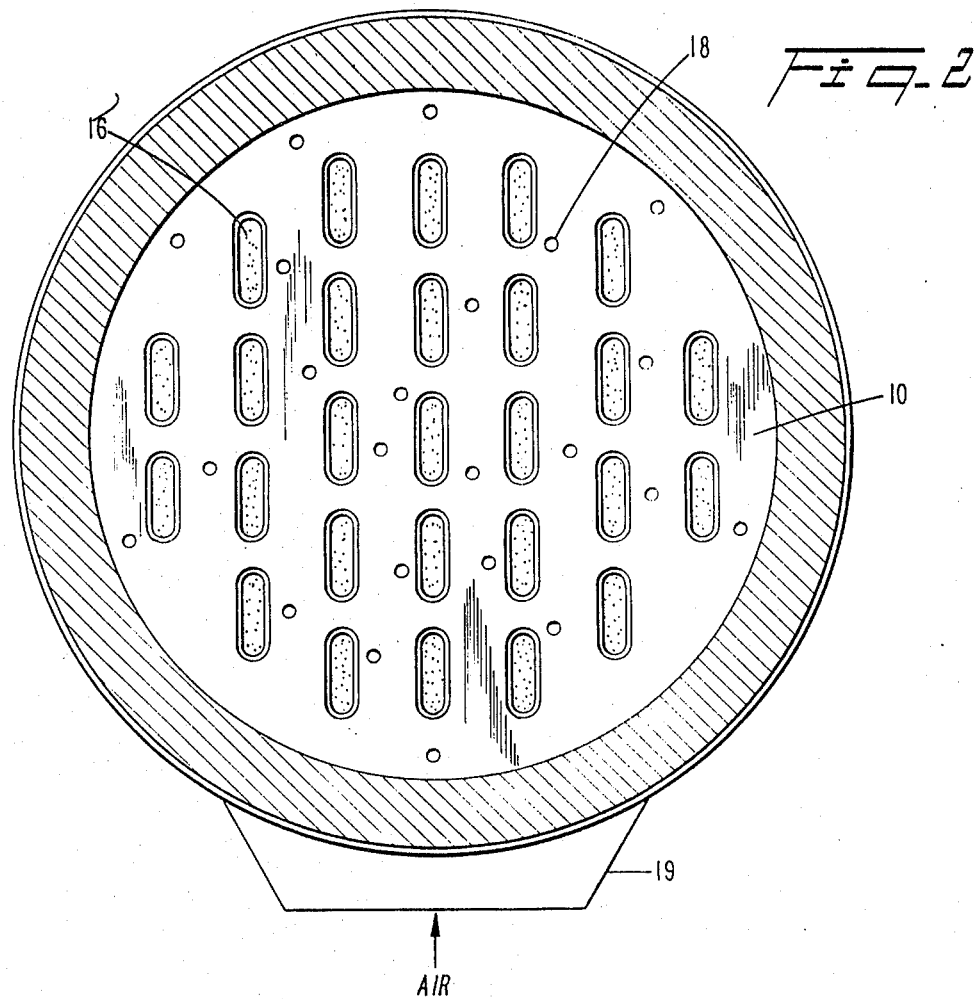
FIG. 2 is a horizontal sectional view taken along line 2—2 of FIG. 1 and showing the upper face of the support surface of the plate grid in accordance with the present invention.
Figure 3:
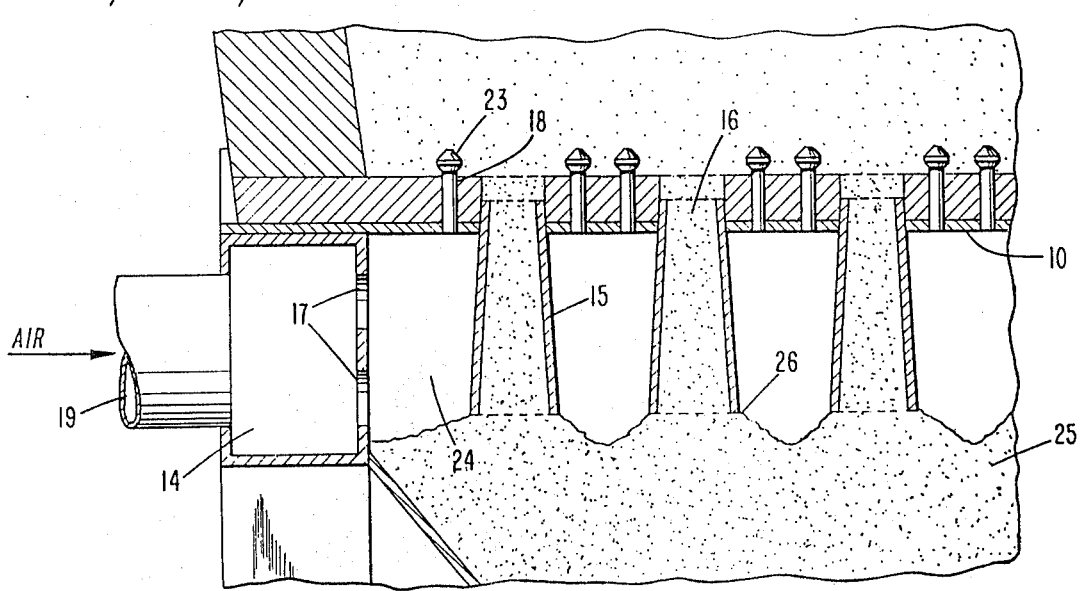
FIG. 3 is an enlarged vertical sectional view, partly broken away, showing the air distribution means and conduit means in accordance with the present invention.

In accordance with the present invention, the plate grid 22 is provided with air distribution means extending through the support surface 10 for delivering pressurized gas, such as air, to the reactor. As best seen in FIG. 2, the air distribution means preferably is a plurality of uniformly distributed apertures 18 extending through the support surface 10. As seen in FIG. 3, the apertures 18 can include nozzles 23 extending from the upper face of the support surface 10. Any conventional nozzle structure can be used.

Also in accordance with the present invention, the plate grid 22 is provided with conduit means extending through the support surface 10 for removing refuse, such as tramp material and/or agglomerated material, from the reactor. Preferably, the conduit means is a plurality of uniformly distributed openings 16, depicted as oval-shaped in FIG. 2, each opening 16 including downwardly diverging walls 15 forming a conduit extending from the lower face of the support surface 10. The openings 16 should be of a size sufficient to permit tramp material and/or agglomerated material to pass through. As a result of the walls 15 being downwardly diverging, the tramp material and/or agglomerated material need pass only one point of contact before falling through. Consequently, the likelihood of such material jamming between the walls 15 is minimized.

The fluidized bed reactor in accordance with the present invention that includes the above-described plate grid 22 most preferably further includes chamber means having an upper end and a lower end located below the support surface 10 and in communication with both the air distribution means and conduit means, means to supply pressurized air to the upper end of the chamber means from a point at or above the lower end of the downwardly diverging walls, and means to remove particulate and tramp material from the chamber means.

As depicted in FIG. 1, the chamber means is preferably a conical-shaped chamber 12. The upper end of the chamber 12 is formed by the lower face of the support surface 10. The lower end of the chamber 12 includes means to remove particulate and tramp material from the chamber 12, depicted in FIG. 1 as a closeable port 13. The particulate material usually includes granular bed material and agglomerated material. A source of pressurized air 19, e.g., a blower, feeds air to the plenum 14. As can be seen from FIGS. 1 and 3, the plenum 14 then feeds the air through openings 17 to the upper end of the chamber 12 from a point at or above the lower end 26 of downwardly diverging walls 15.

In sharp contrast to prior art fluidized bed reactors, the fluidized bed reactor in accordance with the present invention does not have a separate air chamber located below the support surface 10. Instead, the chamber 12, which receives the tramp and/or agglomerated material from the reactor, also functions as a chamber for pressurized air for the air distribution means (apertures 18). This can best be seen by reference to FIGS. 1 and 3. The space 24 between the lower face of support surface 10 and the surface of particulate and tramp material 25 functions as an air chamber to provide pressurized air to apertures 18. Since the plate grid 22 does not have an integral bottom wall that forms an enclosed air chamber, the plate grid 22 can be considered bottomless. Thus, any granular bed material that enters nozzles 23 falls directly into the chamber containing the particulate and tramp material 25, instead of into an enclosed air chamber as in the prior art. Thus, the attendant problems of a reduction in fluidization during operation and the cleaning of an enclosed air chamber are eliminated.

The length of the downwardly diverging walls 15 is important for the proper operation of the reactor. Specifically, the length of the downwardly diverging walls 15 must be such that at maximum air flow of the blower, the pressure drop across the conduits is greater than the combined pressure drop across the apertures 18 and the nozzles 23, thereby preventing air from entering the conduits. Moreover, the minimum length of the downwardly diverging walls should be such as to prevent the development of high air velocities and prevent significant entrainment of particulate material from the chamber 12 into the nozzles 23.

When the fluidized bed reactor is being put into initial operation, the reactor is filled with granular material up to a desired static bed height to form a bed of granular material 21. Since the granular material entering the reactor passes through the conduits, filling of the reactor with granular material necessarily results in granular material also filling the conduits and the chamber 12 up to the lower end 26 of walls 15. Pressurized gas is then introduced into the space 24, thus formed, and discharged upwardly through the apertures 18 for fluidizing the granulated bed, as previously described.

As the combustion process proceeds, refuse material passes through the openings 16 and the conduits into the chamber 12. The refuse and/or granular material is then discharged through port 13 at a rate to maintain the bed of granular material 21 at a desired level.

Although the invention has been described in the environment of combusting non-uniform particulate material, such as wood waste, municipal refuse, carbonaceous material, etc., it is apparent that the apparatus and method of the invention can be used in other environments in which fluidized bed reactors find utility.

It will be apparent to those of ordinary skill in the art that various modifications and variations can be made to the above-described embodiments without departing from the scope of the appended claims and their equivalents.

What is claimed is:

1. A fluidized bed reactor utilizing a bed of granular material for combusting non-uniform particulate matter, the combustion process resulting in refuse including tramp material and/or agglomerated material, comprising:

peripheral walls forming a reactor bed;
   a plate grid having a support surface with an upper face and a lower face;
   air distribution means extending through the support surface for delivering pressurized air to the reactor bed;
   conduit means extending through the support surface for removing tramp material and/or agglomerated material from the reactor bed, said conduit means including downwardly diverging walls extending from the lower face of the support surface;
   chamber means located below said support surface and having an upper end and a lower end, the lower end of said chamber means functioning to collect refuse and/or granular material passing through said conduit means wherein the top surface of said collected refuse is in contact with the lower end of the downwardly diverging walls of said conduit means, and the upper end of said chamber means, which is formed by the lower face of said support surface and the top surface of said collected refuse, functioning as the sole source of pressurized air to said distribution means; and
   a plunum surrounding, and in fluid communication with, the upper end of said chamber means for supplying pressurized air to the upper end of said chamber means from a point at or above the lower end of said downwardly diverging walls.

2. The fluidized bed reactor of claim 1 further comprising means to remove refuse and granular material from said chamber means.

3. The fluidized bed reactor of claims 2, or 1 wherein the upper face of said support surface has a refractory covering.

4. The fluidized bed reactor of claims 2, or 1 wherein the air distribution means include apertures in said support surface and nozzles fitted in said apertures and extending from the upper face of said support surface.

5. The fluidized bed reactor of claims 2, or 1 wherein the length of said downwardly diverging walls is such that when said means to supply pressurized air is operating at maximum air flow, the pressure drop across said conduit means is greater than the pressure drop across said air distribution means.

* * * * *